July 8, 1969     H. BLUMHARDT     3,454,014

AUTOMATIC CONCAVE RELEASE DEVICE

Filed Sept. 7, 1966

INVENTOR

Harold Blumhardt

BY Robert E. Kleve

ATTORNEY

United States Patent Office 3,454,014
Patented July 8, 1969

3,454,014
AUTOMATIC CONCAVE RELEASE DEVICE
Harold Blumhardt, Rte. 2, Fredonia, N. Dak. 58440
Filed Sept. 7, 1966, Ser. No. 577,637
Int. Cl. A01f *12/00*
U.S. Cl. 130—27                                       2 Claims

ABSTRACT OF THE DISCLOSURE

The invention comprises an automatic concave release device having a wall bracket adapted to be mounted to the wall of a threshing machine with a pivotally mounted locking plate and linkage connecting the locking plate to the concave of the threshing machine with a locking means for the control bracket adapted to release the control plate from the wall when material jams between the threshing cylinder and concave to allow the concave to move away from the threshing cylinder.

---

This invention relates to farm equipment, more particularly, the invention relates to safety release eauipment for threshing machines.

It is an object of the invention to provide a novel overload release device for the concave of a threshing cylinder.

It is a further object of the invention to provide a novel overload release device for the concave of a threshing cylinder which automatically releases the concave from operative relation with the threshing cylinder when an overload occurs.

It is a further object of the invention to provide a novel overload release device which can be adjusted to overloads of various different pressures to automatically release.

Further objects and advantages of the invention will become apparent when the description proceeds and when taken in conjunction with the accompanying drawing wherein.

Briefly stated, the invention comprises a pivotally mounted bracket which has a pair of tongue plates which are spring biased together and are adapted to encircle a fixed rod to hold the bracket in place and thereby hold the concave in operative relation to the threshing cylinders and are adapted to release from the rod under the excess pressure of an overload of crop material between the concave and the threshing cylinder, a handle is also mounted to the bracket for the operator to grasp to return the bracket to its operative position after the overload of crop material jammed or bunched between the concave and cylinder has been cleared.

Figure 1:
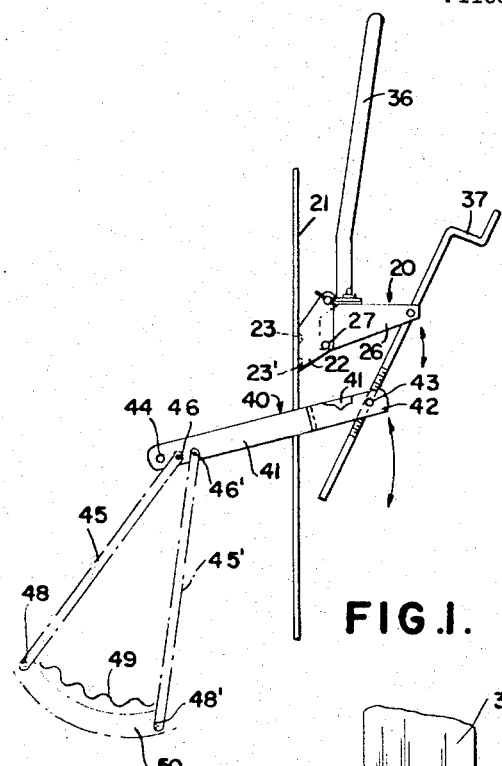
FIGURE 1 is a side elevational view of the automatic overload release device for a concave.

Referring more particularly to the drawing in FIGURE 1, the automatic overload release invention 20 is shown mounted to the wall 21 of a threshing machine. The overload release invention 20 has a U-shaped wall bracket 22 which is fixed to the wall 21 by bolts or rivets 23 and 23'.

The wall bracket 22 has a cylindrical rod 24 fixed between the side walls 25 and 25' of the wall bracket.

A control bracket 26 is pivotally mounted to the wall bracket by a bolt 27, which passes through bores in the side walls 25 and 25' in the wall bracket and through bores in the side walls 28 and 28' of the control bracket to pivotally supported the control bracket. The bracket 26 has a top plate 26' which is fixed between the side walls 28 and 28' of the control bracket.

A pair of opposing locking plates 29 and 30 are positioned on top of the top plate 26' and a bolt 30 passes through bores 29', 30', and 26" in the locking plates 29 and 30, and top plate 26', respectively. A spring 31 surrounds the bottom portion of the bolt 30 and a washer 32 and the head of the bolt 30 hold the spring from the bottom and urge it up against the underside of the top plate 26'. A nut 33 is threaded onto the top of the bolt 30. The spring 31 holds the locking plates together under pressure and the nut 33 may be threaded upward or downward on the bolt 30 to vary the spring pressure and make it easier or more difficult to separate the locking plates from one another.

Figure 2:
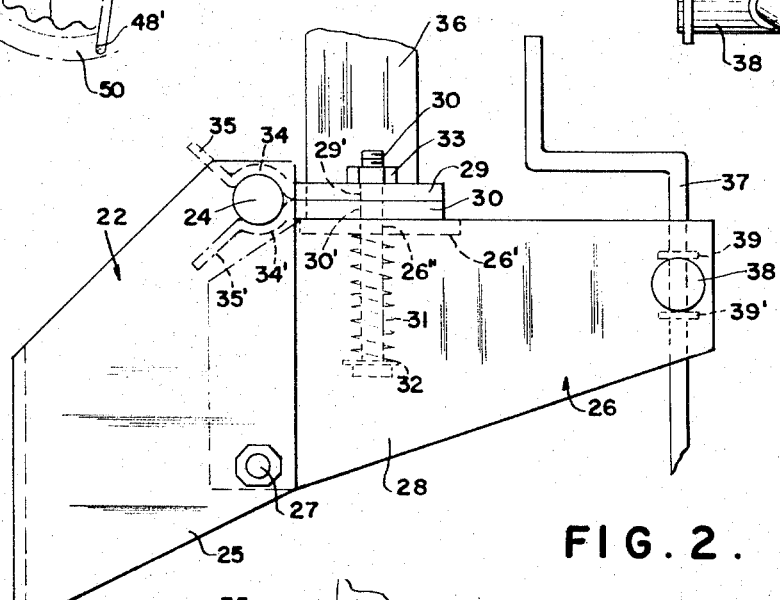
FIGURE 2 is an enlarged side elevational view of the automatic overload release device.

The locking plates 29 and 30 each have cylindrical channel portions 34 and 34' with outwardly flared ends 35 and 35'. The cylindrical channel portions 34 and 34' surround the rod 24 to lock the control bracket to the wall bracket and the flared ends act as deflecting surfaces to engage the rod 24 and separate the locking plates so that locking plates can slide on opposite sides of the rod 24 and come to rest with the channels 34 and 34' surrounding the rod 24 as illustrated in FIGURE 2.

The control bracket has a handle 36 fixed to the control plate for the manual pivotal movement of the control plate about the axis of bolt 27.

A crank 37 extends through a cylindrical rod 38 and is free to rotate relative to the rod 38 with flange portions 39 and 39' securing the crank 37 from axial movement relative to the rod 38. The rod 38 is rotatably mounted in the outer ends of the flanges 28 and 28'.

Below the control bracket 20 is a conventional structure 40 for raising and lowering the concave 50. The structure 40 includes a plate 41. The plate 41 has a mating outer plate 42 secured thereto and spaced at its outer end with a rod 43 rotatably mounted at the outer ends of plates 41 and plate 42.

The rod 43 has a threaded bore with the crank 37 threaded into the bore, whereby the turning of the crank pivots plate 41 upward and downward about the axis of the bolt 44 which bolt is fixed to the threshing machine 21. A pair of rods 45 and 45' are pivotally mounted to the plate 41 at locations 46 and 46' at their upper ends and pivotally mounted to the concave 50 at locations 48 and 48'. The concave 50 is generally illustrated in operative position beneath a conventional threshing cylinder 49 in FIGURE 1 and acts to support and carry the crop material as it passes between the concave and threshing cylinder and to urge it against the threshing cylinder for threshing.

If the crop material becomes jammed between the concave and threshing cylinder the pressure will tend to force the concave 50 downward and thereby cause the plate 41 to pivot downward about the bolt 44. The pivoting of the plate 41 downward pulls the crank 37 downward and the crank in turn pulls the control bracket 26 downward about the axis of the bolt 27. The pulling of the control bracket 26 downward causes the locking plates 29 and 30 to move with the control bracket and to engage and separate from the rod 24 as illustrated in FIGURE 4, so that the locking plates can slide free of the rod 24. Once the locking plates have slid free of the rod 24 the control bracket can continue to pivot downward lowering the concave relative to the threshing cylinder. The lowering of the concave provides more space between the threshing cylinder and concave. The rotating threshing cylinder, with this increased space, will normally then clear the jammed material or rocks or other objects between the concave, so that the normal threshing operation can be resumed. Once the jammed material has cleared from between the concave and threshing cylinder, the operator will grasp the handle 36 and pivot the control bracket 26 back up to its normal position illustrated in FIGURE 1 with the locking plates relocking with the rod 24. The manual pivoting of the control bracket upward causes the flanges 35 and 35' of the locking plates to engage rod 24 and separate (as illustrated in FIGURE 4) and pass on opposite sides of the rod 24 to slide back to their position illustrated in FIGURES 1, 2, and 3.

Figure 3:
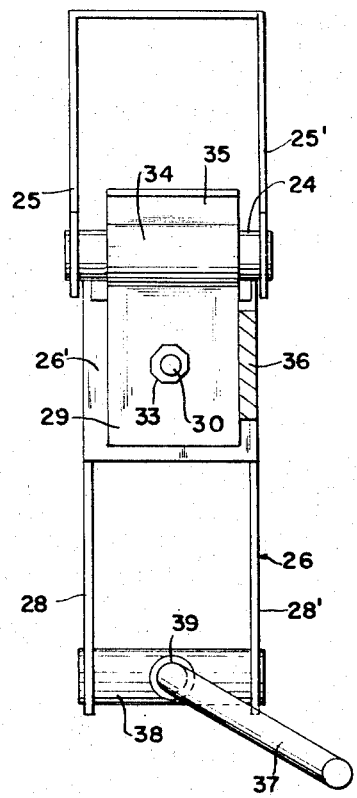
FIGURE 3 is a top plan view of the automatic overload release device.
Figure 4:
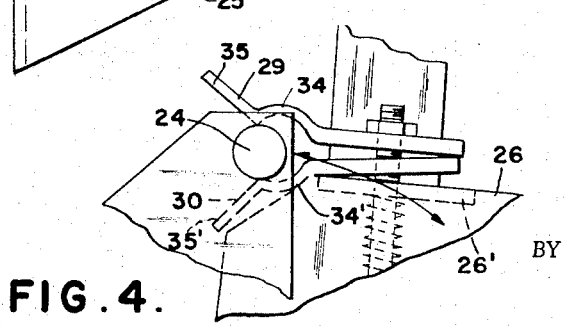
FIGURE 4 is a fragmentary side elevational view of the automatic overload release device about to be operatively engaged.

The spring 31 creates sufficient pressure to hold the locking plates on opposite sides of the rod 24, as illustrated in FIGURE 2 and to hold the control plate in its position illustrated in FIGURES 1–3 and to prevent the control plate from pivoting downward, unless a jamming occurs between the concave and threshing cylinder. The pressure of spring 31 holding the plates 29 and 30 together may be increased or decreased by the turning of bolt 33, so that the control plate may be adjusted to release under heavier or lighter loads and remain locked in its position shown in FIGURE 1, unless the pressure of the jammed material exceeds this level of adjustment.

Thus, it will be seen that a novel automatic overload release mechanism has been provided which will automatically release and lower the concave from its operative position with the threshing cylinder in the event an overload or jamming of the crop material occurs, and which may be readily returned to its operative position by the operator grasping the handle 36 and pivoting the handle upward and thereby pivoting the control bracket upward and relocking it in its normal position thereby returning the concave to its normal position, and remain locked in this position until another overloading or jamming occurs, all of which may be done while the combine continues in operation.

It will be obvious that various changes and departures may be made to the invention without departing from the spirit and scope thereof and accordingly it is not intended that the invention be limited to that specifically described in the specification or illustrated in the drawings but only as set forth in the appended claims wherein what is claimed is:

1. In a threshing machine having a threshing cylinder and a concave cooperating with said cylinder and adapted to be raised to an operative position and lowered to an inoperative position, the combination of an overload release device said device comprising a bracket adapted to be mounted to the side of said threshing machine, lower rod means having lower end portions pivotally mounted to said concave to raise and lower said concave, a pivotally mounted arm spaced above said concave, said lower rod means having upper end portions pivotally mounted to said arm adjacent the pivot point of said arm whereby the raising and lowering of said arm raises and lowers said concave, an upper rod pivotally mounted to the outer end of said arm and extending upward, a pair of elongated plates having channeled outer ends channeled laterally of the length of the plates in parallel opposed relation, a rod mounted to said bracket, said channel outer ends of said plates adapted to encircle said rod of said bracket and when encircling said rod holding said upper rod and said arm and lower rod means in an upward position and thereby holding said concave in an upper operative position, spring means urging said plates together to hold said channel portions of said plates to said rod of said bracket and thereby maintain said concave in its raised operative position, said plates adapted to separate in opposition to said spring means in response to downward pressure upon said concave caused by jamming to allow said plates, upper rod, arm, said lower rod means, and concave to move downward.

2. The combination according to claim 1 wherein said plates each has outward diverging flanges adjacent the outer edges of said channel portion to enable said plates to be engaged against said rod on said bracket to separate the plates to reintroduce the rod and said bracket between said channel portions to relatch said plate, upper rod, arm, lower rod means, and concave in their upper position.

References Cited
UNITED STATES PATENTS

| | | | |
|---|---|---|---|
| 740,215 | 9/1903 | Bartholow | 130—27.16 |
| 2,931,363 | 4/1960 | Bulin | 130—27.16 |
| 2,959,175 | 11/1960 | Oberholtz et al. | |
| 3,101,721 | 8/1963 | Fuller. | |

ANTONIO F. GUIDA, *Primary Examiner.*